(12) United States Patent
Howey et al.

(10) Patent No.: US 10,566,811 B2
(45) Date of Patent: Feb. 18, 2020

(54) METHOD AND APPARATUS ESTIMATING AND CONTROLLING BATTERY STATE

(71) Applicants: Samsung Electronics Co., Ltd., Suwon-si (KR); Oxford University Innovation Limited, Oxford (GB)

(72) Inventors: David A. Howey, Oxford (GB); Adrien M. Bizeray, Oxford (GB)

(73) Assignees: Samsung Electronics Co., Ltd., Suwon-si (KR); Oxford University Innovation Limited, Oxford (GB)

( * ) Notice: Subject to any disclaimer, the term of this patent is extended or adjusted under 35 U.S.C. 154(b) by 25 days.

(21) Appl. No.: 15/867,193

(22) Filed: Jan. 10, 2018

(65) Prior Publication Data

US 2018/0198300 A1    Jul. 12, 2018

Related U.S. Application Data

(60) Provisional application No. 62/445,026, filed on Jan. 11, 2017.

(30) Foreign Application Priority Data

Apr. 28, 2017    (KR) .................. 10-2017-0055636

(51) Int. Cl.
*H02J 7/00* (2006.01)
*H01M 10/04* (2006.01)

(52) U.S. Cl.
CPC .......... *H02J 7/0047* (2013.01); *H01M 10/045* (2013.01); *H02J 2007/005* (2013.01)

(58) Field of Classification Search
CPC ............... Y02E 60/12; G01R 31/3648; G01R 31/3651; G01R 31/3624; H02J 7/0047
(Continued)

(56) References Cited

U.S. PATENT DOCUMENTS 8,880,253 B2 * 11/2014 Li .................... B60W 10/26
701/22
9,132,745 B1    9/2015 Lee
(Continued)

FOREIGN PATENT DOCUMENTS

CN    102714330 B    1/2016
JP    8-20495 B2    3/1996
(Continued)

OTHER PUBLICATIONS

S. Santhanagoplan, et al., "Parameter Estimation and Model Discrimination for a Lithium-Ion Cell," *Journal of the Electrochemical Society*, vol. 154, Issue 3, 2007, pp. A198-A206.
(Continued)

*Primary Examiner* — Arun C Williams
(74) *Attorney, Agent, or Firm* — NSIP Law

(57) ABSTRACT

A method of estimating a battery state includes acquiring one or more parameters for estimating a present state of the battery based on a previous state of the battery; acquiring a present usage environment of the battery; and estimating the present state by applying any one or any combination of any two or more of the previous state, the present usage environment, and the acquired one or more parameters to an electrochemical model that is expressed by simplified parameters simplified by either one or both of parameter grouping and partial non-dimensionalising of an electrochemical reaction governing equation of the battery.

28 Claims, 4 Drawing Sheets

(58) Field of Classification Search
USPC .......................................................... 320/132
See application file for complete search history.

(56) References Cited

U.S. PATENT DOCUMENTS

| | | | | |
|---|---|---|---|---|
| 9,197,078 | B2 | 11/2015 | Lee | |
| 9,331,513 | B2 | 5/2016 | Greening et al. | |
| 2003/0184307 | A1* | 10/2003 | Kozlowski | B60L 3/0046 324/427 |
| 2007/0159137 | A1* | 7/2007 | Verbrugge | G01R 31/367 320/132 |
| 2007/0257681 | A1* | 11/2007 | Christophersen | G01R 31/367 324/426 |
| 2010/0033132 | A1* | 2/2010 | Nishi | B60K 6/365 320/136 |
| 2010/0085057 | A1* | 4/2010 | Nishi | H01M 10/44 324/427 |
| 2010/0280777 | A1* | 11/2010 | Jin | B60L 3/0046 702/63 |
| 2011/0088484 | A1 | 4/2011 | Camilleri | |
| 2015/0251556 | A1* | 9/2015 | Meyer | B60L 11/1861 701/22 |
| 2016/0023566 | A1* | 1/2016 | Lee | B60L 11/1851 429/50 |
| 2016/0052419 | A1* | 2/2016 | Takahashi | B60L 58/12 429/61 |
| 2016/0202325 | A1* | 7/2016 | Tang | G01R 31/3648 702/63 |

FOREIGN PATENT DOCUMENTS

| | | |
|---|---|---|
| JP | 8-136626 A | 5/1996 |
| JP | 8-505950 A | 6/1996 |
| JP | 2009-245874 A | 10/2009 |
| JP | 2015-518390 A | 5/2010 |
| JP | 2014-143138 A | 8/2014 |
| WO | WO 2015/015083 A1 | 2/2015 |

OTHER PUBLICATIONS

A. P. Schmidt, et al., "Experiment-driven electrochemical modeling and systematic parameterization for a lithium-ion battery cell," *Journal of Power Sources*, vol. 195, Issue 15, 2010, pp. 5071-5080.

G. Richardson, et al., "Multiscale modeling and analysis of lithium-ion battery charge and discharge," *Journal of Engineering Mathematics*, vol. 72, Issue 1, Feb. 2012, pp. 41-72.

J. C. Forman, et al., "Genetic identification and fisher identifiability analysis of the Doyle-Fuller-Newman model from experimental cycling of a LiFePO$_4$ cell," *Journal of Power Sources*, vol. 210, 2012, pp. 263-275.

D. C. López, et al., "A Computational Framework for Identifiability and Ill-Conditioning Analysis of Lithium-Ion Battery Models," *Industrial & Engineering Chemistry Research*, vol. 55, Issue 11, 2016, pp. 3026-3042.

M. A. Rahman, et al., "Electrochemical model parameter identification of a lithium-ion battery using particle swarm optimization method," *Journal of Power Sources*, vol. 307, 2016, pp. 86-97.

* cited by examiner

|  | SOC_1 | SOC_2 | ... | SOC_M |
|---|---|---|---|---|
| SOH_1 | par. set(1, 1) | par. set(1, 2) | ... | par. set(1, M) |
| SOH_2 | par. set(2, 1) | par. set(2, 2) | ... | par. set(2, M) |
| ... | ... | ... | ... | ... |
| SOH_N | par. set(N, 1) | par. set(N, 2) | ... | par. set(M, M) |

METHOD AND APPARATUS ESTIMATING AND CONTROLLING BATTERY STATE

CROSS-REFERENCE TO RELATED APPLICATIONS

This application claims the benefit under 35 USC § 119(e) of U.S. Provisional Application No. 62/445,026 filed on Jan. 11, 2017, in the U.S. Patent and Trademark Office, and claims the benefit under 35 USC § 119(a) of Korean Patent Application No. 10-2017-0055636 filed on Apr. 28, 2017, in the Korean Intellectual Property Office, the entire disclosures of which are incorporated herein by reference for all purposes.

BACKGROUND

1. Field

The following description relates to a technology of estimating a state of a battery.

2. Description of Related Art

A battery is used as a power source of a mobile device or an electric vehicle (EV), and it is important to accurately estimate a battery state for an optimal battery operation. For example, when a state of charge (SOC) or a state of health (SOH) of a battery is accurately estimated, an applicable field (e.g., usable capacity) of the battery may be extended and the battery may be stably used, which may lead to an enhancement in a battery life performance. When a state of a battery is incorrectly estimated, the battery may be overcharged or overdischarged during charging or discharging of the battery.

Various schemes to estimate a battery state are provided, for example, a look-up table model, an electric circuit model (or an equivalent circuit model), or an electrochemical model. In the look-up table model and the electric circuit model, a state of a battery that is operating is estimated, however, it is impossible to reflect an electrochemical characteristic of the battery. The electrochemical model has a high accuracy in comparison to the other models and provides a variety of information about an internal state of a battery. Also, in the electrochemical model employs a governing equation with physical meanings, for example, the electric charge conservation law, the mass conservation law or the energy conservation law, and accordingly it is possible to generate a physical result in comparison to the other models. However, because the electrochemical model includes a large number of parameters, it is difficult to measure a considerable number of the parameters. Due to the large number of parameters and an incorrect parameter estimation, an accuracy and a speed of an estimation of a battery state based on the electrochemical model are reduced. Accordingly, there is a desire for a technology for increasing a performance of a battery state estimation by accurately estimating a parameter in an electrochemical model and simplifying a parameter estimation process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of estimating a battery state, the method including: acquiring one or more parameters for estimating a present state of the battery based on a previous state of the battery; acquiring a present usage environment of the battery; and estimating the present state by applying any one or any combination of any two or more of the previous state, the present usage environment, and the acquired one or more parameters to an electrochemical model that is expressed by simplified parameters simplified by either one or both of parameter grouping and partial non-dimensionalising of an electrochemical reaction governing equation of the battery.

The partial non-dimensionalising may include non-dimensionalising a characteristic of an active material of the battery.

The characteristic may include either one or both of a concentration of a material included in the active material and radial coordinates of the active material.

The electrochemical model may be defined by either one or both of a single particle model (SPM) and a linearisation of a voltage equation of the battery and is expressed by the simplified parameters, and the simplified parameters may include any one or any combination of any two or more of a diffusion time constant of a cathode of the battery, a diffusion time constant of an anode of the battery, and a charge transfer resistance of the battery.

The diffusion time constant of the cathode is defined based on a radius of a particle of the cathode and a diffusion coefficient corresponding to the particle of the cathode, the diffusion time constant of the anode is defined based on a radius of a particle of the anode and a diffusion coefficient corresponding to the particle of the anode, and the charge transfer resistance is acquired by measuring an impedance of the battery.

The acquiring of the one or more parameters may include acquiring any one or any combination of any two or more of a diffusion time constant of a cathode of the battery, a diffusion time constant of an anode of the battery, and a charge transfer resistance, and the diffusion time constants and the charge transfer resistance correspond to the previous state.

The acquiring of the one or more parameters may include acquiring one or more parameters corresponding to the previous state from either one or both of a table generated by mapping the simplified parameters to states of the battery and a function that defines a relationship between the simplified parameters and the states, and a state of the battery may include either one or both of a state of charge (SOC) and a state of health (SOH) of the battery.

The estimating of the present state may include: applying the previous state to an initial condition of the electrochemical model; applying the present usage environment to a boundary condition of the electrochemical model; applying the acquired one or more parameters to the simplified parameters of the electrochemical model; and estimating the present state based on the electrochemical model to which the previous state, the present usage environment, and the acquired one or more parameters are applied.

The electrochemical model is defined by a single particle model (SPM) and is expressed by the simplified parameters, and the simplified parameters may include any one or any combination of any two or more of a diffusion time constant of a cathode of the battery, a diffusion time constant of an anode of the battery, a kinetics time constant of the cathode, a kinetics time constant of the anode, a maximum theoretical electrode capacity of the cathode, and a maximum theoretical electrode capacity of the anode.

The diffusion time constant of the cathode is defined based on a radius of a particle of the cathode and a diffusion coefficient corresponding to the particle of the cathode, the diffusion time constant of the anode is defined based on a radius of a particle of the anode and a diffusion coefficient corresponding to the particle of the anode, the kinetics time constant of the cathode is defined based on the radius of the particle of the cathode, a reaction rate constant corresponding to the particle of the cathode, and an electrolyte concentration of the cathode, the kinetics time constant of the anode is defined based on the radius of the particle of the anode, a reaction rate constant corresponding to the particle of the anode, and an electrolyte concentration of the anode, the maximum theoretical electrode capacity of the cathode is defined based on a volume fraction of an active material in the cathode, a thickness of the cathode, a maximum concentration in the particle of the cathode and a surface area of the cathode, and the maximum theoretical electrode capacity of the anode is defined based on a volume fraction of an active material in the anode, a thickness of the anode, a maximum concentration in the particle of the anode and a surface area of the anode.

The simplified parameters are independent of each other in the electrochemical model.

The present usage environment may include any one or any combination of any two or more of a current, a voltage, and a temperature of the battery.

In another general aspect, there is provided a processor-implemented method of generating battery state information, the method including: acquiring an electrochemical model that is expressed by parameters simplified by either one or both of parameter grouping and partial non-dimensionalising of an electrochemical reaction governing equation of a battery; acquiring one or more parameters corresponding to states of the electrochemical model; and generating either one or both of a table in which the acquired one or more parameters are mapped to the states and a function that defines a relationship between the acquired one or more parameters and the states.

The electrochemical model is defined by either one or both of a single particle model (SPM) and a linearisation of a voltage equation of the battery and is expressed by the simplified parameters, and the partial non-dimensionalising may include non-dimensionalising of a characteristic of an active material of the battery, and the characteristic may include either one or both of a concentration of a material included in the active material and radial coordinates of the active material.

The acquiring of the one or more parameters may include: acquiring charge transfer resistances corresponding to states of charge (SOCs) through impedance measurements for each SOC in a predetermined state of health (SOH) of the battery; and acquiring diffusion time constants of a cathode of the battery and diffusion time constants of an anode of the battery from the electrochemical model based on charge transfer resistances corresponding to the SOCs from among the charge transfer resistances, wherein the diffusion time constants correspond to the SOCs.

The acquiring of the one or more parameters further may include: acquiring the charge transfer resistances corresponding to SOCs through impedance measurements for each SOC in SOHs including the predetermined SOH; and acquiring diffusion time constants of the cathode and diffusion time constants of the anode from the electrochemical model based on charge transfer resistances corresponding to the SOCs and the SOHs, and the diffusion time constants correspond to the SOCs and the SOHs.

The acquiring of the charge transfer resistances may include: determining whether the parameters are to be updated, based on either one or both of a comparison result between an update cycle and a set update cycle and a comparison result between an SOC of the battery and a set SOC; and acquiring, based on a result of the determining, the charge transfer resistances corresponding to SOCs that increase in response to the battery being charged.

The acquiring of the charge transfer resistances corresponding to the SOCs may include: fully discharging the battery; and acquiring charge transfer resistances corresponding to SOCs that increase in response to the fully discharged battery being charged.

A non-transitory computer-readable storage medium may store instructions that, when executed by the processor, cause the processor to perform the method of generating battery state information.

In another general aspect, there is provided an apparatus for estimating a battery state, the apparatus including a processor configured to: acquire parameters for estimating a present state of a battery based on a previous state of the battery; acquire a present usage environment of the battery; and estimate the present state by applying any one or any combination of any two or more of the previous state, the present usage environment, and the acquired parameters to an electrochemical model that is expressed by simplified parameters simplified by either one or both of parameter grouping and partial non-dimensionalising of an electrochemical reaction governing equation of the battery.

Other features and aspects will be apparent from the following detailed description, the drawings, and the claims.

Figure 1:
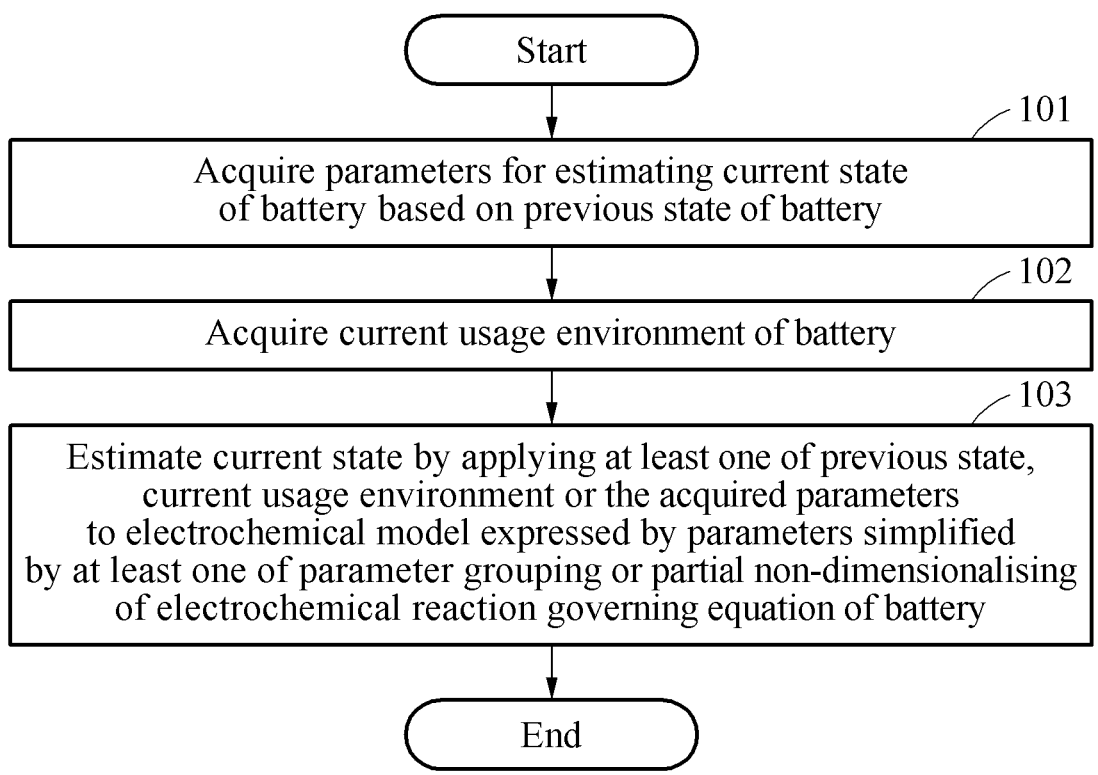
FIG. 1 is a flowchart illustrating an example of a battery state estimation method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or apparatuses described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described in detail with reference to the accompanying drawings, and like reference numerals in the drawings refer to like elements throughout.

FIG. 1 is a flowchart illustrating an example of a battery state estimation method.

Referring to FIG. 1, in operation 101, a battery state estimation apparatus acquires parameters for estimating a present state (i.e., a current state) of a battery based on a previous state of the battery. The battery state estimation apparatus is an apparatus for estimating a battery state and is implemented as, for example, a processor(s) module configured to execute instructions stored on a non-transitory computer readable medium, a hardware module, or a combination thereof. For example, the battery state estimation apparatus is (or is implemented as) a battery management system (BMS). The BMS is a system configured to manage a battery, and is configured to monitor a state of the battery, to maintain an optimized condition for operating the battery, to estimate a time to replace the battery, to detect a problem of the battery, to generate a control signal or command signal associated with the battery and to control an operation or the state of the battery. Further, the BMS system is configured to perform these functions based on a state of the battery, wherein the state of the battery is estimated by the BMS. For example, the BMS system is configured to control charging and discharging of the battery based on the estimated state of the battery, such that the battery operates within a safe operating area with respect to current, voltage, charge, and/or temperature of the battery.

A state of a battery includes a state associated with a life and a charge degree of the battery, and includes, for example, a state of charge (SOC) and a state of health (SOH). For example, the battery state estimation apparatus acquires parameters of an electrochemical model to estimate a current SOC based on a previous SOC. The SOC quantitatively represents a charge state of the battery. The SOC indicates an amount of energy stored in the battery, and the amount is indicated as 0% to 100%. For example, 0% indicates a fully discharged state and 100% indicates a fully charged state, which is variously modified and defined depending on a design intent or examples. The SOH quantitatively represents a change in a life characteristic of the battery due to an aging effect, and indicates a degree by which the life or capacity of the battery is degraded. The battery state estimation apparatus employs various schemes to estimate an SOC and SOH. Further, the battery state estimation apparatus is configured to control charging and discharging of the battery based on the estimated SOC and/or SOH. For example, the battery state estimation apparatus is configured to reduce or stop a charging of the battery in response to the determined SOC of the battery being above a predetermined threshold, such that overcharging of the battery is prevented. Moreover, the battery state estimation apparatus is configured to reduce or stop a discharging of the battery in response to a determined rate of change of the SOC of the battery being above a predetermined threshold, such that a decrease in a usable capacity and/or the SOH of the battery is prevented.

A battery includes a secondary cell, a capacitor, or a condenser configured to store power by a charging operation. An apparatus including a battery supplies a power to a load using the battery. The load is a main power consumer to consume a power supplied from an external device, and includes, for example, a motor of an electric vehicle (EV), an electric light or an electric heater that consumes a power using a circuit in which a current flows at a predetermined voltage. For example, the battery is a lithium-ion battery. In this example, an electrode of the battery includes an active material that is a lithium compound, and the active material includes lithium ions (Li+). For convenience of description, the battery state estimation method is applied to a lithium-ion battery as described above, however, this is merely an example. Accordingly, examples are applicable to different types of batteries including the lithium-ion battery. The battery includes an electrode into which lithium ions (Li+) are intercalated or from which lithium ions (Li+) are de-intercalated. The battery state estimation apparatus estimates a battery state using the electrochemical model.

Referring back to FIG. 1, in operation 102, the battery state estimation apparatus acquires a present usage environment (i.e., a current usage environment) of the battery. The present usage environment is an environment in which the battery currently operates, and includes, for example, a c-rate, a temperature, a voltage and a current of the battery, or a potential of an electrode of the battery. The present usage environment is estimated or measured by the battery state estimation apparatus. Measuring of a usage environment of the battery includes directly measuring a temperature, a voltage and a current of the battery, or acquiring a value measured by one or more sensors included in the battery state estimation apparatus or by a separate device. The c-rate is a current characteristic of a battery indicating a rate of current for charging and discharging of the battery based on a capacity of the battery, and a unit of "C" is used. For example, when a battery has a capacity of 1,000 milli-ampere hour (mAh) that is an amount of current to be used for 1 hour, and when current for charging and discharging is 1 ampere (A), the c-rate is represented by "1 C=1 A/1,000 mAh."

The battery state estimation apparatus acquires a characteristic associated with the battery from a database (DB) that is provided in advance, to estimate or measure the present usage environment. For example, the DB is implemented as a memory included in the battery state estimation apparatus, or as an external device, for example, a server, that is connectable to the battery state estimation apparatus over a network, or via a wire or wirelessly.

In operation 103, the battery state estimation apparatus estimates the present state by applying any one or any combination of any two or more of the previous state, the present usage environment, and the acquired parameters to an electrochemical model that is expressed by parameters simplified by either one or both of parameter grouping and partial non-dimensionalising of an electrochemical reaction governing equation of the battery. The electrochemical reaction governing equation is an equation that describes an electrochemical reaction of the battery, and includes, for example, equations that mathematically, chemically and physically describe an electrochemical reaction, for example, a diffusion or conduction in the battery, based on an electric charge conservation law, a mass conservation law, or an energy conservation law. The non-dimensionalising is a scheme of eliminating a unit or dimension of a physical quantity, for example, a length, a temperature, a mass or time, and is performed using, for example, a scheme of replacing a predetermined-dimension variable by another variable. For example, for a parameter simplification, the partial non-dimensionalising of the electrochemical reaction governing equation is performed. In this example, the partial non-dimensionalising is non-dimensionalising applied to a portion of variables of the electrochemical reaction governing equation. For example, the partial non-dimensionalising includes non-dimensionalising of a characteristic of an active material in the battery. Also, the characteristic of the active material includes, for example, either one or both of radial coordinates of the active material and a concentration of a material included in the active material. The battery state estimation apparatus estimates a state of the battery using the electrochemical model expressed by the simplified parameters.

The electrochemical model is defined by either one or both of a single particle model (SPM) and a linearisation of a voltage equation of the battery. Parameters of the electrochemical model are simplified by parameter grouping and non-dimensionalising of radial coordinates of an active material in the battery and a concentration of a material included in the active material. A process of simplifying parameters of an electrochemical model will be described below. An example of simplifying parameters of an electrochemical model to which an SPM is applied to six parameters by non-dimensionalising of a characteristic of an active material in the electrochemical model and by grouping the parameters is described. In addition, an example of simplifying parameters of an electrochemical model to three parameters by performing a linearisation of a voltage measurement equation is described. In the above examples of the process of simplifying parameters, a pattern and a target for non-dimensionalising, parameter grouping and linearisation of the electrochemical reaction governing equation are merely examples, and there is no limitation to the pattern and the target. Accordingly, various schemes and methods are used, and the simplified parameters are variously changed. For convenience of description, the process of simplifying parameters is described based on the electrochemical model to which the SPM is applied, however, partial non-dimensionalising and parameter grouping of the electrochemical reaction governing equation is also applicable to an electrochemical model that is expressed unlike the SPM. Also, examples are not limited to the SPM.

Figure 2A:
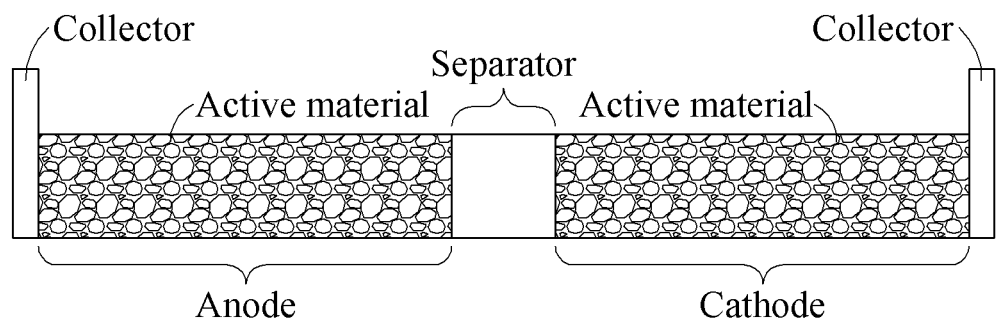
FIG. 2A is a diagram illustrating an example of an electrochemical model of a battery.

FIG. 2A illustrates an example of an electrochemical model of a battery.

Referring to FIG. 2A, the battery includes an electrolyte, a separator, a collector and two electrodes (for example, an anode and a cathode). Lithium ions (Li+) are intercalated into or de-intercalated from the two electrodes. The electrolyte is a medium for movements of lithium ions (Li+). The separator physically separates the cathode from the anode to prevent electrons from directly flowing and to allow ions to pass. The collector collects electrons generated by an electrochemical reaction or supplies electrons for the electrochemical reaction. Each of the cathode and anode includes an active material. For example, lithium cobalt oxide (LiCoO2) is used as an active material of the cathode, and graphite (C6) is used as an active material of the anode. During charging of a battery, lithium ions (Li+) move from the cathode to the anode. During discharging of the battery, lithium ions (Li+) move from the anode to the cathode. Thus, a concentration of lithium ions (Li+) included in the active material of the cathode, and a concentration of lithium ions (Li+) included in the active material of the anode vary depending on the charging and discharging. The battery state estimation apparatus calculates a current concentration distribution of lithium ions (Li+) in the cathode and the anode using the electrochemical model expressed by the simplified parameters, and estimates the present state of the battery.

Spherical Particle Diffusion Model

Figure 2B:
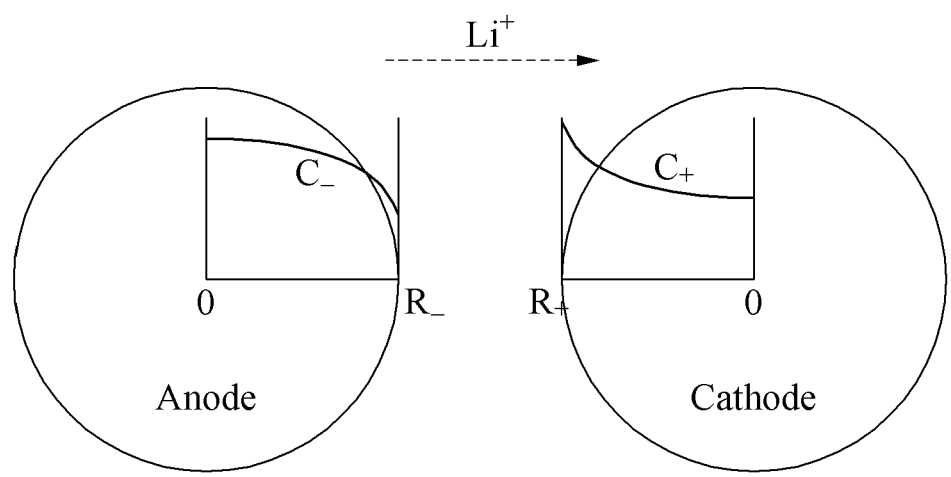
FIG. 2B is a diagram illustrating an example of a single particle model (SPM) applied to an electrochemical model of a battery.

FIG. 2B illustrates an example of an SPM applied to an electrochemical model of a battery.

Referring to FIG. 2B, the electrochemical model is defined by the SPM. A battery state estimation apparatus calculates a concentration distribution of lithium ions (Li+) in an active material from the SPM in a thickness direction of the battery. The thickness direction of the battery is a direction from a collector of each of a cathode and an anode to a separator, or an opposite direction. In FIG. 2B, a horizontal axis represents a radial coordinate system of an active material expressed as a single particle, and a vertical axis represents a concentration of lithium ions (Li+) at a predetermined position in the radial coordinate system. Also, $R_+$ denotes a radius of a particle of the cathode, and $C_+$ denotes a concentration profile (for example, a concentration of lithium ions) in the particle of the cathode. In addition, $R_-$ denotes a radius of a particle of the anode, and $C_-$ denotes a concentration profile in the particle of the anode. Hereinafter, lithium ions (Li+) are referred to as "lithium," for convenience of description.

In the electrochemical model to which the SPM is applied, a diffusion of lithium in an active material of each of electrodes i (for example, an anode or a cathode) of a battery is governed by a Fickian diffusion equation expressed by Equation 1 in spherical coordinates.

$$\frac{\partial c_i}{\partial t} = \frac{D_i}{r_i^2} \frac{\partial}{\partial r_i}\left(r_i^2 \frac{\partial c_i}{\partial r_i}\right) \quad \text{[Equation 1]}$$

In Equation 1, $r_i$ denotes radial coordinates, $c_i$ denotes a lithium concentration profile, and $D_i$ denotes a lithium diffusion coefficient (assumed uniform) in an electrode i. The subscript i has either a positive value or negative value to represent a cathode domain or anode domain, respectively. A diffusion equation is subject to Equation 2 that represents Neumann boundary conditions at a particle center $r_i$ of "0" and surface $r_i=R_i$ and Equation 3 that represents an initial condition equation.

$$\frac{\partial c_i}{\partial r_i}\bigg|_{r_i=0} = 0 \text{ and } D_i \frac{\partial c_i}{\partial r_i}\bigg|_{r=R_i} = -j_i \quad \text{[Equation 2]}$$

$$c_i(0, r_i) = c_i^0 \quad \text{[Equation 3]}$$

In Equation 3, $c_i^0$ denotes an initial concentration profile in each particle. $j_i$ denotes a molar flux and expresses a rate of a lithium intercalation/de-intercalation reaction. Molar fluxes in the SPM are directly related to a current I applied to the battery based on Equation 4.

$$j_- = \frac{+I}{a_-\delta_-\mathcal{F}\mathcal{A}} \text{ and } j_+ = \frac{-I}{a_+\delta_+\mathcal{F}\mathcal{A}} \quad \text{[Equation 4]}$$

In Equation 4, "$a_i=3\varepsilon_i/R_i$" denotes a predetermined active surface area in the electrode i, $\varepsilon_i$ denotes a volume fraction of an active material in an electrode, F denotes a Faraday constant, A denotes an electrode surface area that is assumed to be equal for both electrodes, and $\delta_i$ denotes a thickness of the electrode i. A battery discharge current has a positive value, and a charge current has a negative value. Also, the above molar flux expressions assume an electrochemical reaction including a single electron transfer in an example of the lithium intercalation/de-intercalation reaction.

Voltage Measurement Equation

Initial-boundary value problems, that is, Equations 1 through 3 for each electrode constitute a dynamic part of the SPM. A battery terminal voltage V is given by a nonlinear measurement equation expressed by Equation 5.

$$V = U_+(x_+^s) - U_-(x_-^s) + \eta_+ - \eta_- \quad \text{[Equation 5]}$$

In Equation 5, $U_-$ and $U_+$ denote open-circuit potentials (OCPs) of an anode and a cathode. $U_-$ and $U_+$ are empirical nonlinear functions of a surface stoichiometry of each particle $x_i^s = c_i^s/c_i^{max}$. $\eta_i$ denotes an overpotential and is a voltage drop due to a departure from an equilibrium potential associated with an intercalation/de-intercalation reaction in each electrode. A relationship between a reaction rate $j_i$ and the overpotential $\eta_i$ is given by a Butler-Volmer kinetics equation expressed by Equation 6.

$$j_i = \frac{i_{0,i}}{\mathcal{F}}\left(\exp\left(\frac{\alpha_{a,i}\mathcal{F}}{RT}\eta_i\right) - \exp\left(\frac{-\alpha_{c,i}\mathcal{F}}{RT}\eta_i\right)\right) \quad \text{[Equation 6]}$$

An exchange current density $i_{0,i}$ depends on a reaction rate constant $k_i$, and reactants and products concentrations, that is, an electrolyte concentration $c_e$ (that is an assumed constant in the above model) and a lithium solid-phase concentration $c_i^s$ at a surface of a particle, and is expressed using Equation 7.

$$i_{0,i} = k_i \mathcal{F} \sqrt{c_e}\sqrt{c_i^s}\sqrt{c_i^{max} - c_i^s} \quad \text{[Equation 7]}$$

When an anodic charge transfer coefficient $\alpha_{a,i}$ and a cathodic charge transfer coefficient $\alpha_{c,i}$ in Equation 6 are assumed to be the same as "0.5," the overpotential $\eta_i$ is expressed as a function of the reaction rate $j_i$ using Equation 8.

$$\eta_i = \frac{2RT}{\mathcal{F}} \sinh^{-1}\left(\frac{j_i \mathcal{F}}{2i_{0,i}}\right) \quad \text{[Equation 8]}$$

Identification of Grouped Parameters

The electrochemical model of the SPM is over-parameterized in a sense that only a subset of parameters may be estimated from measured input-output data. A first step for a credible parameter estimation is to reformulate a model in terms of a minimum number of parameter groups. To identify groups of parameters, dimensionless radial coordinates $\bar{r} = r_i/R_i$ are introduced in electrochemical reaction governing equations, and a stoichiometry $x_i = c_i/c_i^{max}$ is introduced instead of a concentration in the electrochemical reaction governing equations. Also, to set an initial condition to zero in the electrochemical reaction governing equations, a change in a variable $\bar{x}_i = x_i - x_i^0$ is introduced with $x_i^0 = c_i^0/c_i^{max}$ that is an initial stoichiometry in each particle i. A time independent variable t is kept dimensional because diffusion time constants are different in each electrode. When the above dimensionless variables are introduced, initial-boundary value problems, that is, Equations 1 through 3 are written equivalently as Equation 9.

$$\frac{\partial \bar{x}_i}{\partial t} = \frac{D_i}{R_i^2} \frac{1}{\bar{r}^2} \frac{\partial}{\partial \bar{r}}\left(\bar{r}^2 \frac{\partial \bar{x}_i}{\partial \bar{r}}\right) \quad \text{[Equation 9]}$$

Boundary conditions are expressed by Equation 10.

$$\frac{\partial \bar{x}_i}{\partial \bar{r}}\bigg|_{\bar{r}=0} = 0 \text{ and } \frac{\partial \bar{x}_i}{\partial \bar{r}}\bigg|_{\bar{r}=1} = \frac{-R_i}{D_i c_i^{max}} j_i \quad \text{[Equation 10]}$$

An initial condition is expressed by Equation 11.

$$\bar{x}_i(0,\bar{r}) = 0 \quad \text{[Equation 11]}$$

A boundary condition at a surface of a particle in each electrode is written in terms of an input current I instead of fluxes $j_i$ using Equation 4, and expressed using Equations 12 and 13.

$$\frac{\partial \bar{x}_+}{\partial \bar{r}}\bigg|_{\bar{r}=1} = +\frac{R_+^2}{D_+}\frac{I}{3\epsilon_+\delta_+c_+^{max}\mathcal{F}\mathcal{A}} \qquad [\text{Equation 12}]$$

$$\frac{\partial \bar{x}_-}{\partial \bar{r}}\bigg|_{\bar{r}=1} = -\frac{R_-^2}{D_-}\frac{I}{3\epsilon_-\delta_-c_-^{max}\mathcal{F}\mathcal{A}} \qquad [\text{Equation 13}]$$

Similarly, using Equation 4, Equation 8 representing an overpotential of each electrode is expressed as shown in Equations 14 and 15.

$$\eta_+ = \qquad [\text{Equation 14}]$$
$$\frac{2RT}{\mathcal{F}}\sinh^{-1}\left(-\frac{R_+}{2k_+\sqrt{c_e}}\frac{1}{3\epsilon_+\delta_+c_+^{max}\mathcal{F}\mathcal{A}}\frac{I}{\sqrt{x_+^s(1-x_+^s)}}\right)$$

$$\eta_- = \frac{2RT}{\mathcal{F}}\sinh^{-1}\left(+\frac{R_-}{2k_-\sqrt{c_e}}\frac{1}{3\epsilon_-\delta_-c_-^{max}\mathcal{F}\mathcal{A}}\frac{I}{\sqrt{x_-^s(1-x_-^s)}}\right) \qquad [\text{Equation 15}]$$

Equation 5 indicating a voltage measurement equation remains unchanged. Six physically meaningful groups of parameters naturally arise in the above equations. Indeed, three groups of parameters, that is, a diffusion time constant $\tau_i^d$, a kinetics time constant $\tau_i^k$ and a maximum theoretical electrode capacity $Q_i^{th}$ are identified for each electrode. Expressions for the six physically meaningful groups are defined by Equations 16, 17 and 18.

$$\tau_+^d = \frac{R_+^2}{D_+} \qquad [\text{Equation 16}]$$
$$\tau_-^d = \frac{R_-^2}{D_-}$$

$$\tau_+^k = \frac{R_+}{2k_+\sqrt{c_e}} \qquad [\text{Equation 17}]$$
$$\tau_-^k = \frac{R_-}{2k_-\sqrt{c_e}}$$

$$Q_+^{th} = -\epsilon_+\delta_+c_+^{max}\mathcal{F}\mathcal{A} \qquad [\text{Equation 18}]$$
$$Q_-^{th} = +\epsilon_-\delta_-c_-^{max}\mathcal{F}\mathcal{A}$$

For convenience, a maximum theoretical electrode capacity $Q_+^{th}$ of the cathode is defined as a negative value to yield the same model structure in both the anode and cathode. Substituting the grouped parameters into governing equations results in a diffusion equation for both the cathode and anode as shown in Equation 19.

$$\frac{\partial \bar{x}_i}{\partial t} = \frac{1}{\tau_i^d}\frac{1}{\bar{r}^2}\frac{\partial}{\partial \bar{r}}\left(\bar{r}^2\frac{\partial \bar{x}_i}{\partial \bar{r}}\right) \qquad [\text{Equation 19}]$$

Boundary conditions are expressed by Equation 20.

$$\frac{\partial \bar{x}_i}{\partial \bar{r}}\bigg|_{\bar{r}=0} = 0 \text{ and } \frac{\partial \bar{x}_i}{\partial \bar{r}}\bigg|_{\bar{r}=1} = -\frac{\tau_i^d}{3Q_i^{th}}I \qquad [\text{Equation 20}]$$

An initial condition is expressed by Equation 21.

$$\bar{x}_i(0,\bar{r})=0 \qquad [\text{Equation 21}]$$

A voltage measurement equation is expressed by Equation 22.

$$V=U_+(x_+^s)-U_-(x_-^s)+\eta_+-\eta_- \qquad [\text{Equation 22}]$$

Overpotentials of the cathode and anode are expressed by Equations 23 and 24.

$$\eta_+ = \frac{2RT}{F}\sinh^{-1}\left(\frac{\tau_+^k}{3Q_+^{th}}\frac{I}{\sqrt{x_+^s(1-x_+^s)}}\right) \qquad [\text{Equation 23}]$$

$$\eta_- = \frac{2RT}{F}\sinh^{-1}\left(\frac{\tau_-^k}{3Q_-^{th}}\frac{I}{\sqrt{x_-^s(1-x_-^s)}}\right) \qquad [\text{Equation 24}]$$

Referring to Equations 19 through 24, six groups of parameters that fully parametrise an SPM given by a parameter vector $\theta \in \mathbb{R}^6$ are identified. The parameter vector $\theta$ is expressed by Equation 25.

$$\theta = \begin{bmatrix} \tau_+^d & \frac{\tau_+^d}{3Q_+^{th}} & \frac{\tau_+^k}{3Q_+^{th}} & \tau_-^d & \frac{\tau_-^d}{3Q_-^{th}} & \frac{\tau_-^k}{3Q_-^{th}} \end{bmatrix}^T \qquad [\text{Equation 25}]$$

Unlike the parameters defined in Equations 16 through 18, grouped parameters $\theta_i$ appear only once and do not appear as a product of each other in equations of the electrochemical model. Also, a one-to-one mapping relationship between six parameters $\theta_i$ and six parameters in Equations 16 through 18 is defined by Equation 26.

$$\begin{cases} \tau_+^d = \theta_1 \\ \tau_+^k = (\theta_1\theta_3)/\theta_2 \\ Q_+^{th} = \theta_1/(3\theta_2) \\ \tau_-^d = \theta_4 \\ \tau_-^k = (\theta_4\theta_6)/\theta_5 \\ Q_-^{th} = \theta_4/(3\theta_5) \end{cases} \qquad [\text{Equation 26}]$$

In an example, initial electrode stoichiometries $x_i^0$ (that is, an SOC) may be known and OCPs may be known functions of a surface stoichiometry for each electrode. In this example, six parameters included in $\theta$, or equivalently the six parameters defined in Equations 16 through 18 are sufficient to fully parametrise the SPM.

As described above, the electrochemical model defined as an SPM is expressed by six parameters by parameter grouping and partial non-dimensionalising of the electrochemical reaction governing equation. The battery state estimation apparatus estimates a present state of a battery using the electrochemical model with the six simplified parameters. The six simplified parameters include, for example, a diffusion time constant of a cathode of the battery, a diffusion time constant of an anode of the battery, a kinetics time constant of the cathode, a kinetics time constant of the anode, a maximum theoretical electrode capacity of the cathode, and a maximum theoretical electrode capacity of the anode as shown in Equations 16 through 18, and include a combination thereof as shown in Equation 26. Also, the simplified parameters are independent of each other in the electrochemical model. The diffusion time constant of the cathode is defined based on a radius of a particle of the cathode and a diffusion coefficient corresponding to the particle of the cathode. The diffusion time constant of the anode is defined based on a radius of a particle of the anode and a diffusion coefficient corresponding to the particle of the anode. The kinetics time constant of the cathode is defined based on the radius of the particle of the cathode, a reaction rate constant corresponding to the particle of the cathode, and an electrolyte concentration of the cathode. The kinetics time constant of the anode is defined based on the radius of the particle of the anode, a reaction rate constant corresponding to the particle of the anode, and an electrolyte concentration of the anode. The maximum theoretical electrode capacity of the cathode is defined based on a volume fraction of an active material in the cathode, a thickness of the cathode, a maximum concentration in the particle of the cathode and a surface area of the cathode. The maximum theoretical electrode capacity of the anode is defined based on a volume fraction of an active material in the anode, a thickness of the anode, a maximum concentration in the particle of the anode and a surface area of the anode.

The battery state estimation apparatus acquires parameters for estimating the present state. The parameters for estimating the present state are, for example, parameters corresponding to the previous state. For example, the battery state estimation apparatus acquires parameters corresponding to the previous state from a table generated by mapping the simplified parameters to states of the battery, and also acquires the parameters corresponding to the previous state from a function that defines a relationship between the simplified parameters and the states.

The battery state estimation apparatus applies the parameters corresponding to the previous state to Equation 21 that expresses the initial condition of the electrochemical model, and applies an acquired present usage environment to Equation 20 that expresses the boundary conditions of the electrochemical model. Also, the battery state estimation apparatus applies the parameters acquired to estimate the present state to the electrochemical model. The battery state estimation apparatus estimates the present state using Equations 19 through 24 of the electrochemical model to which the previous state, the present usage environment and the acquired parameters are applied.

Structural Identifiability

A set of six grouped parameters is identified as sufficient to fully parametrise an SPM. For example, several approaches are used to investigate a parameter identifiability of a dynamical model from input-output data. Hereinafter, a structural identifiability of an SPM is described. In the structural identifiability, a mathematical identifiability of a model is investigated irrespective of identification data that is considered or also assumed noise-free. A definition of a structural identifiability for linear time-invariant dynamic models that may be cast into a transfer function $H(s, \theta)$ parametrised by a vector of parameters $\theta$ is given as follows.

Definition 1. a model structure M with a transfer function $H(s, \theta)$ parametrised by $\theta \in D \subset R^n$, in which n denotes a number of parameters of a model, is considered. An identifiability equation for the model structure M is expressed by Equation 27.

$$H(s,\theta)=H(s,\theta^*) \text{ for almost all } s \qquad \text{[Equation 27]}$$

In Equation 27, "$\theta$, $\theta^* \in D$" is satisfied. The model structure M is found to be: globally identifiable when Equation 27 has a unique solution in D; locally identifiable when Equation 27 has a finite number of solutions in D; and unidentifiable when Equation 27 has an infinite number of solutions in D.

The SPM is not a linear dynamical model due to Equation 22 that represents the voltage measurement equation incorporating Equations 23 and 24 associated with nonlinear Butler-Volmer kinetics, and nonlinear OCP functions. Thus, Definition 1 may not directly be used to investigate the structural identifiability of the SPM unless the model is first linearised by assuming a small perturbation around a fixed depth-of-discharge (DoD) point. Because the nonlinear OCP functions are assumed to be measured and known a priori, a linearisation is a valid approach to obtain parameters of diffusion sub-models that are linear, and to obtain a linearised approximation of the kinetics.

Diffusion Model Transcendental Transfer Function

Definition 1 requires a model transfer function. For example, a model transfer function for a spherical particle diffusion model is derived first. The following description is provided of an example of combining model transfer functions that will be described below with a transfer function of a linearised voltage measurement equation to derive a transfer function for a linearised SPM. To simplify a derivation of a diffusion model transfer function, a change of a variable $\bar{u}_i = \bar{r} x_i$ is introduced into initial-boundary value problems that correspond to Equations 19 through 21 that describe a diffusion in a spherical particle. Based on a change in a variable of Equation 19, Equation 19 is written equivalently as Equation 28.

$$\frac{\partial \bar{u}_i}{\partial t} = \frac{1}{\tau_i^d} \frac{\partial^2 \bar{u}_i}{\partial r_i^2} \qquad \text{[Equation 28]}$$

Equation 20 representing the boundary conditions is expressed by Equation 29.

$$\bar{u}_i(r_i = 0) = 0 \text{ and } \left.\frac{\partial \bar{u}_i}{\partial \bar{r}}\right|_{\bar{r}=1} - u(\bar{r}=1) = \frac{-\tau_i^d}{3C_i^{th}} I \qquad \text{[Equation 29]}$$

A homogeneous Neumann boundary condition at a center of a particle is reduced to a simpler homogeneous Dirichlet boundary condition so that $\lim_{r_i \to 0} c_i(r_i)$ remains finite. By introducing the above change of the variable, Equation 3 representing the initial condition is simplified to Equation 30.

$$\bar{u}_i(0,\bar{r})=0 \qquad \text{[Equation 30]}$$

Because initial-boundary value diffusion problems that correspond to Equations 28 through 30 are linear, an equivalent transfer function is determined without a loss of generality. A Laplace transform of Equation 28 is performed, to yield Equation 31.

$$\frac{d^2 \bar{U}_i(s,\bar{r})}{d\bar{r}^2} - s\tau_i^d \bar{U}_i(s,\bar{r}) = 0 \qquad \text{[Equation 31]}$$

In Equation 31, s denotes a frequency-domain Laplace variable. A characteristic equation for Equation 31 that is a differential equation, is expressed by Equation 32.

$$\lambda^2 - s\tau_i^d = 0 \Rightarrow \lambda = \pm\sqrt{s\tau_i^d} \qquad \text{[Equation 32]}$$

Accordingly, a general solution is expressed by Equation 33.

$$\bar{U}_i(s,\bar{r}) = A_i(s)e^{+\bar{r}\sqrt{s\tau_i^d}} + B_i(s)e^{-\bar{r}\sqrt{s\tau_i^d}} \qquad \text{[Equation 33]}$$

In Equation 33, the general solution has two constants (with respect to $\bar{r}$), that is, $A_i(s)$ and $B_i(s)$ that are to be determined using Equation 29 that represents boundary conditions. Substituting of Equation 33 into Equation 29 that represents a particle center boundary condition at $\bar{r}=0$ yields Equation 34.

$$B_i(s) = -A_i(s) \qquad \text{[Equation 34]}$$

Substituting of Equations 33 and 34 into Equation 29 that represents a surface boundary condition at $\bar{r}=1$ yields Equation 35.

$$A_i(s) = \frac{\tau_i^d}{3C_i^{th}} \frac{I(s)/2}{\sinh\left(\sqrt{s\tau_i^d}\right) - \sqrt{s\tau_i^d}\cosh\left(\sqrt{s\tau_i^d}\right)} \qquad \text{[Equation 35]}$$

Substituting of Equations 34 and 35 into Equation 33 yields a general solution for $\bar{U}_i(s,\bar{r})$ as shown in Equation 36.

$$\bar{U}_i(s,\bar{r}) = \frac{\tau_i^d}{3C_i^{th}} \frac{\sinh\left(\bar{r}\sqrt{s\tau_i^d}\right)}{\sinh\left(\sqrt{s\tau_i^d}\right) - \sqrt{s\tau_i^d}\cosh\left(\sqrt{s\tau_i^d}\right)} I(s) \qquad \text{[Equation 36]}$$

A variable of interest is a surface stoichiometry $\bar{X}_i^s(s)$, rather than $\bar{U}_i(s,\bar{r})$, because $\bar{U}_i(s,\bar{r})$ is a variable involved in the voltage measurement equation. When "$\bar{u}_i = \bar{r}\bar{x}_i$" is substituted into Equation 36, when an evaluation is performed at $\bar{r}=1$, and when a division by an input current $I(s)$ is performed, a transfer function $H_i^d(s)$ for a spherical diffusion model is derived as shown in Equation 37.

$$H_i^d(s) = \frac{\bar{X}_i^s}{I(s)} = \frac{\tau_i^d}{3C_i^{th}} \frac{\tanh\left(\sqrt{s\tau_i^d}\right)}{\tanh\left(\sqrt{s\tau_i^d}\right) - \sqrt{s\tau_i^d}} \qquad \text{[Equation 37]}$$

Thus, diffusion transfer functions of a cathode and anode expressed in terms of a parameter vector $\theta$ are expressed by Equations 38 and 39, respectively.

$$H_+^d(s, \theta) = \frac{\theta_2 \tanh\left(\sqrt{s\theta_1}\right)}{\tanh\left(\sqrt{s\theta_1}\right) - \sqrt{s\theta_1}} \qquad \text{[Equation 38]}$$

$$H_-^d(s, \theta) = \frac{\theta_5 \tanh\left(\sqrt{s\theta_4}\right)}{\tanh\left(\sqrt{s\theta_4}\right) - \sqrt{s\theta_4}} \qquad \text{[Equation 39]}$$

Linearisation of Voltage Measurement Equation

The voltage measurement equation is a nonlinear function of each of anode and cathode surface stoichiometries $x_-^s$ and $x_+^s$ and the input current $I$. For example, when it is assumed that an amplitude of the input current $I$ remains small and a battery operates close to an initial DoD, that is, a stoichiometry of both electrodes remains close to an initial value $x_i^0$, the voltage measurement equation is linearised using a first-order Taylor series approximation about a reference point $x_0 = (x_+^0, x_-^0, I_0=0)$ based on Equation 40.

$$V \approx V(x_0) + \frac{\partial V}{\partial x_+^s}\bigg|_{x_0} \bar{x}_+^s + \frac{\partial V}{\partial x_-^s}\bigg|_{x_0} \bar{x}_-^s + \frac{\partial V}{\partial I}\bigg|_{x_0} I \qquad \text{[Equation 40]}$$

An equilibrium voltage of the battery at a DoD linearisation point is expressed by Equation 41.

$$V(x_0) = U_+(x_+^0) - U_-(x_-^0) \qquad \text{[Equation 41]}$$

When a deviation of a voltage is defined from the equilibrium voltage at the DoD linearisation point, $\bar{V}^0 = V - V(x_0)$ is given by a linear approximation as shown in Equation 42.

$$\bar{V}^0 \approx \frac{\partial V}{\partial x_+^s}\bigg|_{x_0} \bar{x}_+^s + \frac{\partial V}{\partial x_-^s}\bigg|_{x_0} \bar{x}_-^s + \frac{\partial V}{\partial I}\bigg|_{x_0} I \qquad \text{[Equation 42]}$$

A partial derivative of a voltage $V$ with respect to the input current $I$ at a reference point is expressed by Equation 43.

$$\frac{\partial V}{\partial I}\bigg|_{x_0} = \frac{2RT}{\mathcal{F}}\left(\frac{\theta_3}{\sqrt{(1-x_+^0)x_+^0}\sqrt{1+(\theta_3 I_0)^2}} - \frac{\theta_6}{\sqrt{(1-x_-^0)x_-^0}\sqrt{1+(\theta_6 I_0)^2}}\right) \qquad \text{[Equation 43]}$$

By substituting for $I_0=0$, Equation 43 is simplified to Equation 44.

$$\frac{\partial V}{\partial I}\bigg|_{x_0} = \frac{2RT}{\mathcal{F}}\left(\frac{\theta_3}{\sqrt{(1-x_+^0)x_+^0}} - \frac{\theta_6}{\sqrt{(1-x_-^0)x_-^0}}\right) = -R_{ct}^0(\theta) \qquad \text{[Equation 44]}$$

This term is interpreted as a charge transfer resistance, and accordingly is denoted by $R_{ct}^0$, resulting in a charge transfer voltage drop $\eta_{ct} = -R_{ct}^0 I$ in a voltage equation. Partial derivatives with respect to surface stoichiometries in the cathode and anode are expressed by Equations 45 and 46, respectively.

$$\frac{\partial V}{\partial x_+^s}\bigg|_{x_0} = \qquad \text{[Equation 45]}$$

$$+\frac{dU_+}{dx_+^s}\bigg|_{x_+^s = x_+^0} - I_0 \frac{RT}{\mathcal{F}} \frac{\theta_3(1-2x_+^0)}{\sqrt{1+\frac{(\theta_3 I_0)^2}{(1-x_+^0)x_+^0}}((1-x_+^0)x_+^0)^{3/2}}$$

$$\frac{\partial V}{\partial x_-^s}\bigg|_{x_0} = \qquad \text{[Equation 46]}$$

$$-\frac{dU_-}{dx_-^s}\bigg|_{x_-^s = x_-^0} + I_0 \frac{RT}{\mathcal{F}} \frac{\theta_6(1-2x_-^0)}{\sqrt{1+\frac{(\theta_6 I_0)^2}{(1-x_-^0)x_-^0}}((1-x_-^0)x_-^0)^{3/2}}$$

Substituting for $I_0=0$ yields simple equations as shown in Equation 47.

$$\frac{\partial V}{\partial x_+^s}\bigg|_{x_0} = \frac{dU_+}{dx_+^s}\bigg|_{x_+^s = x_+^0} = \alpha_+^0 \text{ and} \qquad \text{[Equation 47]}$$

-continued $$\left.\frac{\partial V}{\partial x_-^s}\right|_{x_0} = \left.\frac{dU_-}{dx_-^s}\right|_{x_-^s = x_-^0} = -\alpha_-^0$$

In Equation 47, $\alpha_i^0$ denotes gradients of OCP functions in each electrode, with respect to a stoichiometry, at a linearisation point. Thus, a linearised voltage measurement equation in a time domain is expressed by Equation 48.

$$\overline{V}(t) = \alpha_+^0 \overline{x}_+^s(t) - \alpha_-^0 \overline{x}_-^s(t) - R_{ct}^0(\theta) I(t) \qquad \text{[Equation 48]}$$

Transfer Function of Linearised SPM

When a Laplace transform of Equation 48 that expresses the linearised voltage measurement equation is performed and when a division by the input current I is performed, a transfer function of a linearised SPM about an equilibrium point $x_0 = (x_+^0, x_-^0, I_0 = 0)$ is obtained as shown in Equation 49.

$$H^0(s, \theta) = \frac{\overline{V}(s)}{I(s)} = \alpha_+^0 H_+^d(s, \theta) - \alpha_-^0 H_-^d(s, \theta) - R_{ct}^0(\theta) \qquad \text{[Equation 49]}$$

Substituting of diffusion transfer functions $H_+^d$ and $H_-^d$ of the anode and cathode into Equations 38 and 39, respectively, yields Equation 50.

$$H^0(s, \theta) = \qquad \text{[Equation 50]}$$
$$\frac{\alpha_+^0 \theta_2 \tanh(\sqrt{s\theta_1})}{\tanh(\sqrt{s\theta_1}) - \sqrt{s\theta_1}} - \frac{\alpha_-^0 \theta_5 \tanh(\sqrt{s\theta_4})}{\tanh(\sqrt{s\theta_4}) - \sqrt{s\theta_4}} - R_{ct}^0(\theta)$$

It is found that only a difference between parameters $\theta_3$ and $\theta_6$ that describe cathode and anode kinetics appears in a charge transfer resistance term $R_{ct}(\theta)$ given by Equation 44. As a result, there are clearly an infinite number of couples $(\theta_3, \theta_6)$ that yield the same transfer function and only a lumped parameter $R_{ct}$ may be estimated using a linearised model at a given DoD. Thus, a parameter space is reduced to five parameters by combining the cathode and anode kinetics into the charge transfer resistance term $R_{ct}$.

OCP slopes $\alpha_+^0$ and $\alpha_-^0$ are assumed as known parameters, however, are not directly measureable, because an OCP may only be measured with respect to a capacity (in units Ah or Coulombs) in practice, not against a stoichiometry (that is non-dimensional). When a theoretical capacity of an electrode is given by $Q_i^{th} = c_i^{max} FV_i$, in which "$V_i = \varepsilon A \delta_i$" is satisfied and $V_i$ denotes a volume of an active material in the electrode, a variation $\delta x_i$ of a stoichiometry is proportional to a variation $\delta Q$ of a charge/discharge capacity, which is expressed by Equation 51.

$$\delta x_i = \frac{\delta c_i}{c_i^{max}} = \frac{\delta c_i \cdot V_i}{Q_i^{th}} = \frac{\delta Q}{Q_i^{th}} \qquad \text{[Equation 51]}$$

Thus, a derivative of an OCP with respect to $x_i$ is related to a derivative of the OCP with respect to a charge/discharge capacity Q, denoted by $\beta_i^0$, as shown in Equation 52.

$$\beta_i^0 = \frac{\alpha_i}{Q_i^{th}} = \left.\frac{1}{Q_i^{th}} \frac{dU_i}{dx_i^s}\right|_{x_i^{s,0}} = \left.\frac{dU_i}{dQ}\right|_{x_i^{s,0}} \qquad \text{[Equation 52]}$$

Substituting $\alpha_i^0$ for $\beta_i^0$ using Equation 52 in Equation 50 and recalling an expression of $Q_i^{th}$ in terms of $\theta_i$ in Equation 26 yield a transfer function as shown in Equation 53.

$$H^0(s,\theta) = \beta_+^0 f(s,\theta_1) - \beta_-^0 f(s,\theta_4) - R_{ct}^0 \qquad \text{[Equation 53]}$$

In Equation 53, a function $f$ is defined as shown in Equation 54.

$$f(s, \theta_i) = \frac{1}{3} \frac{\theta_i \tanh(\sqrt{s\theta_i})}{\tanh(\sqrt{s\theta_i}) - \sqrt{s\theta_i}} \qquad \text{[Equation 54]}$$

The function $f$ is only parametrised by an electrode diffusion time constant $\theta_1$ or $\theta_4$ in the cathode or anode, respectively. Coefficients $\beta_+^0$ and $\beta_-^0$ are the measurable and assumed known OCP gradients with respect to a capacity in the cathode and anode, respectively, and require access to half-cell or reference electrode cell data which may be obtained from commercially available cells. When individual electrode OCP data is absent, it is impossible to parameterise the SPM directly, although it may be reasonable to use a 2-electrode open-circuit voltage measurement combined with available OCP data from the literature for a graphite negative electrode to infer a positive electrode OCP function.

For example, a parameter estimation problem of the SPM is reduced to three independent parameters. The three parameters include, for example, a cathode diffusion time constant $\tau_+^d$, an anode diffusion time constant $\tau_-^d$ and a charge transfer resistance $R_{ct}$. A vector $\tilde{\theta} \in R^3$ of parameters to be identified is defined using Equation 55.

$$\tilde{\theta} = [\tau_+^d \ \tau_-^d \ R_{ct}^0]^T \qquad \text{[Equation 55]}$$

A transfer function of a linearised SPM is expressed in terms of three parameters defined in $\tilde{\theta}$, and is expressed by Equation 56.

$$H^0(s,\tilde{\theta}) = \beta_+^0 f(s,\tau_+^d) - \beta_-^0 f(s,\theta_4) - R_{ct}^0 \qquad \text{[Equation 56]}$$

Structural Identifiability Analysis

Definition 1 of the structural identifiability is applied to Equation 56 that expresses the transfer function of the SPM parametrised by the three parameters in $\tilde{\theta}$. Based on Definition 1, to check a structural identifiability of a linearised model, Equation 57 needs to be shown.

$$\beta_+^0 f(s,\tau_+^d) - \beta_-^0 f(s,\tau_-^d) - R_{ct}^0 = \beta_+^0 f(s,\tau_+^{d*}) - \beta_-^0 f(s,\tau_-^{d*}) - R_{ct}^{0*} \text{ for almost all } s \qquad \text{[Equation 57]}$$

Equation 57 implies equality of the parameters as shown in Equation 58.

$$[\tau_+^d \ \tau_-^d \ R_{ct}^0]^T = [\tau_+^{d*} \ \tau_-^{d*} \ R_{ct}^{0*}]^T \qquad \text{[Equation 58]}$$

Because the charge transfer resistance is only an additive term independent of s on both sides of the equation, "$R_{ct}^0 = R_{ct}^{0*}$" is satisfied and the structural identifiability equation is reduced to Equation 59.

$$\beta_+^0 f(s,\tau_+^d) - \beta_-^0 f(s,\tau_-^d) = \beta_+^0 f(s,\tau_+^{d*}) - \beta_-^0 f(s,\tau_-^{d*}) \text{ for almost all } s \qquad \text{[Equation 59]}$$

Because $f$ is a non-trivial function of the Laplace variable s, the above equality holds in a general case for almost all s only when "$\tau_+^d = \tau_-^{d*}$" and "$\tau_-^d = \tau_-^{d*}$" are satisfied and the linearised SPM is structurally identifiable. However, there are a few cases in which other solutions exist as follows:

When $\beta_+^0=0$ (respectively, $\beta_-^0=0$), an arbitrary pair $(\tau_+^d, \tau_+^{d*})$ (respectively, $(\tau_-^d, \tau_-^{d*})$) satisfies an identifiability equation and the linearised SPM becomes unidentifiable.

When magnitudes of OCP functions in each electrode are equal to $\beta_+^0=-\beta_-^0=\beta^0$, interchanging the diffusion time constants $\tau_+^d=\tau_-^{d*}$ and $\tau_-^d=\tau_+^{d*}$ satisfies a structural identifiability equation, and the linearised SPM is structurally identifiable provided the diffusion time constants are ordered.

Thus, the linearised SPM is structurally identifiable in the general case.

As described above, the electrochemical model defined by the SPM is expressed by the three parameters through the linearisation of the voltage measurement equation, and the battery state estimation apparatus estimates the present state of the battery using the electrochemical model with the three simplified parameters. The three simplified parameters includes, for example, a diffusion time constant of the cathode of the battery, a diffusion time constant of the anode of the battery, and a charge transfer resistance of the battery as shown in Equation 55. The simplified parameters are independent of each other in the electrochemical model. The diffusion time constant of the cathode and the diffusion time constant of the anode are defined as described above, and the charge transfer resistance is acquired by an impedance measurement of the battery.

According to an example, the battery state estimation apparatus acquires three parameters for estimating a present state of a battery. The parameters for estimating the present state are, for example, parameters corresponding to a previous state of the battery. For example, the battery state estimation apparatus acquires parameters corresponding to the previous state from a table generated by mapping simplified parameters to states of the battery, and also acquires the parameters corresponding to the previous state from a function that defines a relationship between the simplified parameters and the states.

The battery state estimation apparatus applies the acquired parameters to Equation 56 of an electrochemical model expressed by the three parameters, and estimates the present state using the electrochemical model to which the previous state, a present usage environment and the acquired parameters are applied.

Figures 3, 4:
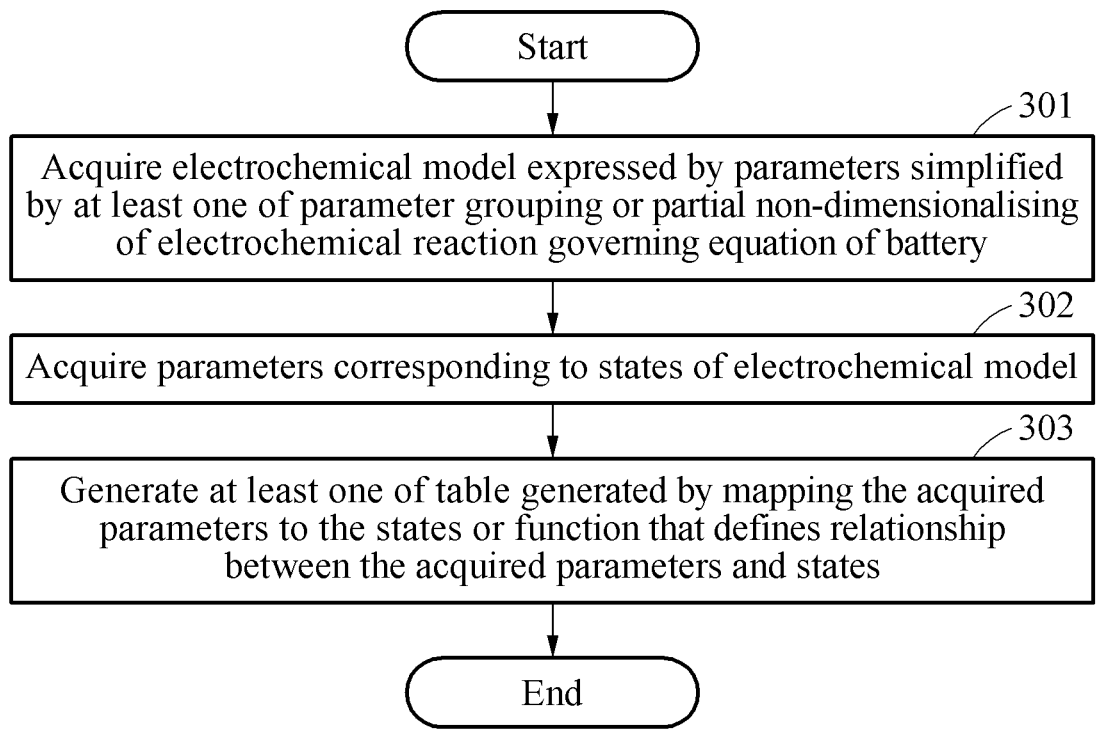
FIG. 3 is a flowchart illustrating an example of a battery state information generation method.
FIG. 4 is a diagram illustrating an example of a mapping table.

FIG. 3 is a flowchart illustrating an example of a battery state information generation method.

Referring to the above description, to acquire parameters for estimating a present state of a battery, a battery state estimation apparatus acquires parameters corresponding to a previous state of the battery from either one or both of a table and a function that represents a relationship between parameters and states of the battery. Hereinafter, an example of generating information about the relationship between the parameters and states is described. The battery state information generation method is performed by, for example, a battery state estimation apparatus or by a separate apparatus independent of the battery state estimation apparatus, and there is no limitation thereto. For convenience of description, a battery state information generation apparatus is designated to perform the battery state information generation method, and the battery state information generation apparatus is implemented by, for example, a processor(s) module configured to execute instructions stored on a non-transitory computer readable medium, a hardware module or a combination thereof.

Referring to FIG. 3, in operation 301, the battery state information generation apparatus acquires an electrochemical model that is expressed by parameters simplified by either one or both of parameter grouping and partial non-dimensionalising of an electrochemical reaction governing equation of a battery. The electrochemical model is defined by either one or both of an SPM and a linearisation of a voltage equation of the battery, and is expressed by the simplified parameters. The partial non-dimensionalising includes non-dimensionalising of a characteristic of an active material of the battery, and the characteristic of the active material includes either one or both of a concentration of a material included in the active material and radial coordinates of the active material. A number of parameters of the electrochemical model is reduced to three or six, however, a scheme of defining simplified parameters and a number of parameters are not limited in the above-described examples.

In operation 302, the battery state information generation apparatus acquires parameters corresponding to states of the electrochemical model. The battery state information generation apparatus estimates parameters corresponding to SOCs in a predetermined SOH of the battery, for each SOH, to acquire parameters corresponding to the SOCs and SOHs. For example, the battery state information generation apparatus estimates parameters corresponding to SOCs and SOHs by an optimization scheme in an electrochemical model expressed by three or six simplified parameters.

For example, in an electrochemical model expressed by three parameters, the battery state information generation apparatus acquires a charge transfer resistance as one of the three parameters through an impedance measurement, and estimates the other parameters based on the acquired charge transfer resistance. In an example, the battery state information generation apparatus acquires charge transfer resistances corresponding to SOCs through impedance measurements for each SOC in a predetermined SOH of a battery, and estimates diffusion time constants of a cathode of the battery and diffusion time constants of an anode of the battery from the electrochemical model based on the charge transfer resistances corresponding to the SOCs. In this example, the diffusion time constants correspond to the SOCs. In another example, the battery state information generation apparatus acquires charge transfer resistances corresponding to SOCs through impedance measurements for each SOC in SOHs, and acquires diffusion time constants of the cathode and diffusion time constants of the anode from the electrochemical model based on the acquired charge transfer resistances. In this example, the diffusion time constants correspond to the SOCs and the SOHs.

As described above, in a scheme of acquiring parameters corresponding to SOCs and SOHs, charge transfer resistances are acquired through impedance measurements and the other parameters are estimated based on the acquired charge transfer resistances, in a state (for example, an off-line state) in which a BMS including the battery state information generation apparatus is not mounted in a device.

In a state (for example, an on-line state) in which the BMS including the battery state information generation apparatus is mounted in the device, parameters are updated based on a set update cycle and a set SOC. The battery state information generation apparatus determines whether the parameters are to be updated based on either one or both of a comparison result between an update cycle and the set update cycle and a comparison result between an SOC of the battery and the set SOC. The battery state information generation apparatus acquires charge transfer resistances corresponding to SOCs that increase in response to the battery being charged, based on a determination result, estimates the other parameters based on the acquired charge transfer resistances and the electrochemical model, and updates the acquired charge transfer resistances and the estimated parameters. In an example, the battery state information generation apparatus receives information on whether parameters are to be updated from a user, based on either one or both of an example in which the update cycle reaches the set update cycle and an example in which the SOC reaches the set SOC. A portion of parameters corresponding to SOCs lower than an SOC measured when charging of the battery is started is later to be updated. In another example, the battery state information generation apparatus fully discharges the battery and acquires charge transfer resistances corresponding to SOCs that increase in response to the fully discharged battery being charged. In this example, the battery is fully discharged by an apparatus separate from the battery state information generation apparatus. In still another example, the battery state information generation apparatus receives a command to fully discharge the battery from a user, and fully discharges the battery based on the received command.

In operation 303, the battery state information generation apparatus generates either one or both of a table in which the acquired parameters are mapped to the states, and a function that defines a relationship between the acquired parameters and the states. For example, the battery state information generation apparatus generates a table in which three parameters or six parameters are mapped to SOCs and SOHs, or a function that defines a relationship between the three or six parameters and the SOCs and SOHs. An example of a mapping table generated by mapping parameters to SOCs and SOHs is shown in FIG. 4. The battery state estimation apparatus uses either one or both of the above-described table and function to acquire parameters for estimating a present state of the battery.

Figure 5A:
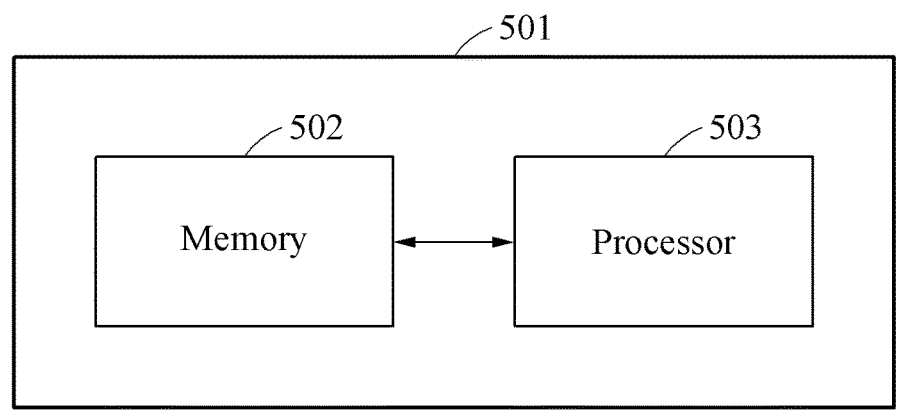
FIG. 5A is a diagram illustrating an example of a battery state estimation apparatus.
Figure 5B:
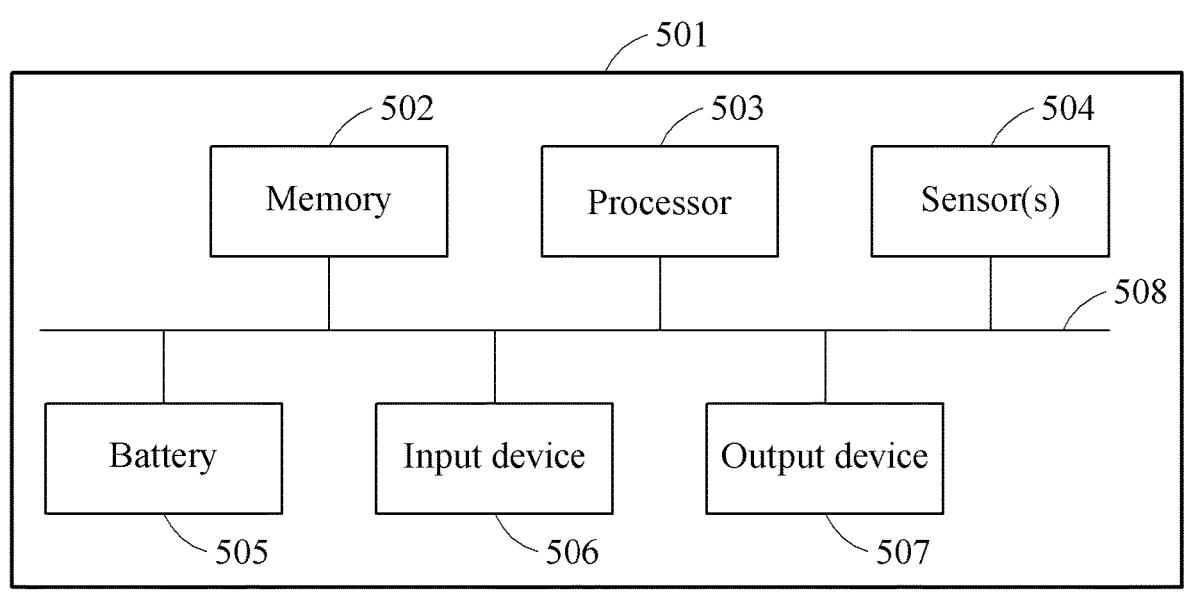
FIG. 5B is a diagram illustrating an example of a battery state estimation apparatus.

FIGS. 5A and 5B illustrate examples of a battery state estimation apparatus 501.

Referring to FIGS. 5A and 5B, the battery state estimation apparatus 501 includes a memory 502 and a processor 503. The processor 503 includes at least one apparatus described above with reference to FIGS. 1 through 4, or performs at least one method described above with reference to FIGS. 1 through 4. The memory 502 stores a program in which a battery state estimation method is implemented. The memory 502 stores either one or both of a table generated by mapping parameters simplified by the above-described scheme to states of a battery and a function that defines a relationship between the simplified parameters and the states of the battery. The memory 502 includes, for example, a volatile memory or a nonvolatile memory.

The processor 503 executes a program and controls the battery state estimation apparatus 501. A program code executed by the processor 503 is stored in the memory 502. The battery state estimation apparatus 501 is connected to an external device (for example, a personal computer (PC) or a network) via an input/output device (not shown) and exchanges data with the external device. A battery state information generation apparatus also includes a memory and a processor although not shown, and the memory and the processor operate similarly to the memory 502 and the processor 503 of the battery state estimation apparatus 501.

Referring to FIG. 5B, the sensor(s) 504 directly measure a temperature, a voltage and/or a current of the battery 505 so that a usage environment of the battery may be determined. The input device 506 receives an input from the user through a tactile, video, audio, or touch input. The input device 506 includes, for example, a keyboard, a mouse, a touchscreen, a microphone, and other devices configured to detect an input from the user and transmit the detected input to the battery state estimation apparatus 501. For example, the input device 506 may receive an input command from the user to update parameters or to discharge or charge the battery 505, and the command may be carried out by the battery state estimation apparatus 501. The output device 507 provides the user with an output of the battery state estimation apparatus 501 through a visual, auditory, or tactile channel. For example, the output device 507 visualizes information related to the battery state and provides the user with the visualized information. For example, the visualized information may indicate a state of the battery such as an SOC or an SOH, or may enable access to further functions of the battery state estimation apparatus 501 demonstrated through the visualized information. The output device 507 includes, for example, a liquid crystal display (LCD), a light-emitting diode (LED) display, a touchscreen, a speaker, a vibration generator, and other devices configured to provide the output to the user. The memory 502, the processor 503, the sensor(s) 504, the battery 505, the input device 506, and the output device 507 communicate with each other via a bus 508. The battery state estimation apparatus 501 may be, for example, a BMS or an electric vehicle.

The battery state estimation apparatus 501, the memory 502, the processor 503, the sensor(s) 504, the battery 505, the input device 506, and the output device 507 in FIGS. 1-5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of estimating a battery state, the method comprising:
   acquiring one or more parameters for estimating a present state of the battery based on a previous state of the battery;
   acquiring a present usage environment of the battery; and
   estimating the present state by applying any one or any combination of any two or more of the previous state, the present usage environment, and the acquired one or more parameters to an electrochemical model that is expressed by simplified parameters simplified by partial non-dimensionalising of an electrochemical reaction governing equation of the battery.

2. The method of claim 1, wherein the partial non-dimensionalising comprises non-dimensionalising a characteristic of an active material of the battery.

3. The method of claim 2, wherein the characteristic comprises either one or both of a concentration of a material included in the active material and radial coordinates of the active material.

4. The method of claim 1, wherein
   the electrochemical model is defined by either one or both of a single particle model (SPM) and a linearisation of a voltage equation of the battery and is expressed by the simplified parameters, and
   the simplified parameters comprise any one or any combination of any two or more of a diffusion time constant of a cathode of the battery, a diffusion time constant of an anode of the battery, and a charge transfer resistance of the battery.

5. The method of claim 4, wherein
the diffusion time constant of the cathode is defined based on a radius of a particle of the cathode and a diffusion coefficient corresponding to the particle of the cathode,
the diffusion time constant of the anode is defined based on a radius of a particle of the anode and a diffusion coefficient corresponding to the particle of the anode, and
the charge transfer resistance is acquired by measuring an impedance of the battery.

6. The method of claim 1, wherein
the acquiring of the one or more parameters comprise acquiring any one or any combination of any two or more of a diffusion time constant of a cathode of the battery, a diffusion time constant of an anode of the battery, and a charge transfer resistance, and
the diffusion time constants and the charge transfer resistance correspond to the previous state.

7. The method of claim 6, wherein
the acquiring of the one or more parameters comprises acquiring one or more parameters corresponding to the previous state from either one or both of a table generated by mapping the simplified parameters to states of the battery and a function that defines a relationship between the simplified parameters and the states, and
a state of the battery comprises either one or both of a state of charge (SOC) and a state of health (SOH) of the battery.

8. The method of claim 1, wherein the estimating of the present state comprises:
applying the previous state to an initial condition of the electrochemical model;
applying the present usage environment to a boundary condition of the electrochemical model;
applying the acquired one or more parameters to the simplified parameters of the electrochemical model; and
estimating the present state based on the electrochemical model to which the previous state, the present usage environment, and the acquired one or more parameters are applied.

9. The method of claim 1, wherein
the electrochemical model is defined by a single particle model (SPM) and is expressed by the simplified parameters, and
the simplified parameters comprise any one or any combination of any two or more of a diffusion time constant of a cathode of the battery, a diffusion time constant of an anode of the battery, a kinetics time constant of the cathode, a kinetics time constant of the anode, a maximum theoretical electrode capacity of the cathode, and a maximum theoretical electrode capacity of the anode.

10. The method of claim 9, wherein
the diffusion time constant of the cathode is defined based on a radius of a particle of the cathode and a diffusion coefficient corresponding to the particle of the cathode,
the diffusion time constant of the anode is defined based on a radius of a particle of the anode and a diffusion coefficient corresponding to the particle of the anode,
the kinetics time constant of the cathode is defined based on the radius of the particle of the cathode, a reaction rate constant corresponding to the particle of the cathode, and an electrolyte concentration of the cathode,
the kinetics time constant of the anode is defined based on the radius of the particle of the anode, a reaction rate constant corresponding to the particle of the anode, and an electrolyte concentration of the anode,
the maximum theoretical electrode capacity of the cathode is defined based on a volume fraction of an active material in the cathode, a thickness of the cathode, a maximum concentration in the particle of the cathode and a surface area of the cathode, and
the maximum theoretical electrode capacity of the anode is defined based on a volume fraction of an active material in the anode, a thickness of the anode, a maximum concentration in the particle of the anode and a surface area of the anode.

11. The method of claim 1, wherein the simplified parameters are independent of each other in the electrochemical model.

12. The method of claim 1, wherein the present usage environment comprises any one or any combination of any two or more of a current, a voltage, and a temperature of the battery.

13. A processor-implemented method of generating battery state information, the method comprising:
acquiring an electrochemical model that is expressed by parameters simplified by partial non-dimensionalising of an electrochemical reaction governing equation of a battery;
acquiring one or more parameters corresponding to states of the electrochemical model; and
generating either one or both of a table in which the acquired one or more parameters are mapped to the states and a function that defines a relationship between the acquired one or more parameters and the states.

14. The method of claim 13, wherein
the electrochemical model is defined by either one or both of a single particle model (SPM) and a linearisation of a voltage equation of the battery and is expressed by the simplified parameters, and
the partial non-dimensionalising comprises non-dimensionalising of a characteristic of an active material of the battery, and
the characteristic comprises either one or both of a concentration of a material included in the active material and radial coordinates of the active material.

15. A processor-implemented method of generating battery state information, the method comprising:
acquiring an electrochemical model that is expressed by parameters simplified by parameter grouping of an electrochemical reaction governing equation of a battery;
acquiring one or more parameters corresponding to states of the electrochemical model; and
generating either one or both of a table in which the acquired one or more parameters are mapped to the states and a function that defines a relationship between the acquired one or more parameters and the states,
wherein the acquiring of the one or more parameters comprises:
acquiring charge transfer resistances corresponding to states of charge (SOCs) through impedance measurements for each SOC in a predetermined state of health (SOH) of the battery; and
acquiring diffusion time constants of a cathode of the battery and diffusion time constants of an anode of the battery from the electrochemical model based on charge transfer resistances corresponding to the SOCs from among the charge transfer resistances, wherein the diffusion time constants correspond to the SOCs.

16. The method of claim 15, wherein
the acquiring of the one or more parameters further comprises:
acquiring the charge transfer resistances corresponding to SOCs through impedance measurements for each SOC in SOHs comprising the predetermined SOH; and
acquiring diffusion time constants of the cathode and diffusion time constants of the anode from the electrochemical model based on charge transfer resistances corresponding to the SOCs and the SOHs, and
the diffusion time constants correspond to the SOCs and the SOHs.

17. The method of claim 15, wherein the acquiring of the charge transfer resistances comprises:
determining whether the parameters are to be updated, based on either one or both of a comparison result between an update cycle and a set update cycle and a comparison result between an SOC of the battery and a set SOC; and
acquiring, based on a result of the determining, the charge transfer resistances corresponding to SOCs that increase in response to the battery being charged.

18. The method of claim 17, wherein the acquiring of the charge transfer resistances corresponding to the SOCs comprises:
fully discharging the battery; and
acquiring charge transfer resistances corresponding to SOCs that increase in response to the fully discharged battery being charged.

19. A non-transitory computer-readable storage medium storing instructions that, when executed by the processor, cause the processor to perform the method of claim 1.

20. An apparatus for estimating a battery state, the apparatus comprising:
a processor configured to:
acquire parameters for estimating a present state of a battery based on a previous state of the battery;
acquire a present usage environment of the battery; and
estimate the present state by applying any one or any combination of any two or more of the previous state, the present usage environment, and the acquired parameters to an electrochemical model that is expressed by simplified parameters simplified by partial non-dimensionalising of an electrochemical reaction governing equation of the battery.

21. The method of claim 13,
wherein the acquiring of the one or more parameters comprises:
acquiring charge transfer resistances corresponding to states of charge (SOCs) through impedance measurements for each SOC in a predetermined state of health (SOH) of the battery; and
acquiring diffusion time constants of a cathode of the battery and diffusion time constants of an anode of the battery from the electrochemical model based on charge transfer resistances corresponding to the SOCs from among the charge transfer resistances, wherein the diffusion time constants correspond to the SOCs.

22. The method of claim 21, wherein
the acquiring of the one or more parameters further comprises:
acquiring the charge transfer resistances corresponding to SOCs through impedance measurements for each SOC in SOHs comprising the predetermined SOH; and
acquiring diffusion time constants of the cathode and diffusion time constants of the anode from the electrochemical model based on charge transfer resistances corresponding to the SOCs and the SOHs, and
the diffusion time constants correspond to the SOCs and the SOHs.

23. The method of claim 21, wherein the acquiring of the charge transfer resistances comprises:
determining whether the parameters are to be updated, based on either one or both of a comparison result between an update cycle and a set update cycle and a comparison result between an SOC of the battery and a set SOC; and
acquiring, based on a result of the determining, the charge transfer resistances corresponding to SOCs that increase in response to the battery being charged.

24. The method of claim 23, wherein the acquiring of the charge transfer resistances corresponding to the SOCs comprises:
fully discharging the battery; and
acquiring charge transfer resistances corresponding to SOCs that increase in response to the fully discharged battery being charged.

25. The method of claim 13,
wherein the acquiring of the electrochemical model includes acquiring the electrochemical model that is expressed by parameters simplified by both of parameter grouping and the partial non-dimensionalising of the electrochemical reaction governing equation of the battery, and
wherein the acquiring of the one or more parameters comprises:
acquiring charge transfer resistances corresponding to states of charge (SOCs) through impedance measurements for each SOC in a predetermined state of health (SOH) of the battery; and
acquiring diffusion time constants of a cathode of the battery and diffusion time constants of an anode of the battery from the electrochemical model based on charge transfer resistances corresponding to the SOCs from among the charge transfer resistances, wherein the diffusion time constants correspond to the SOCs.

26. The method of claim 25, wherein
the acquiring of the one or more parameters further comprises:
acquiring the charge transfer resistances corresponding to SOCs through impedance measurements for each SOC in SOHs comprising the predetermined SOH; and
acquiring diffusion time constants of the cathode and diffusion time constants of the anode from the electrochemical model based on charge transfer resistances corresponding to the SOCs and the SOHs, and
the diffusion time constants correspond to the SOCs and the SOHs.

27. The method of claim 25, wherein the acquiring of the charge transfer resistances comprises:
determining whether the parameters are to be updated, based on either one or both of a comparison result between an update cycle and a set update cycle and a comparison result between an SOC of the battery and a set SOC; and
acquiring, based on a result of the determining, the charge transfer resistances corresponding to SOCs that increase in response to the battery being charged.

28. The method of claim 27, wherein the acquiring of the charge transfer resistances corresponding to the SOCs comprises:
   fully discharging the battery; and
   acquiring charge transfer resistances corresponding to SOCs that increase in response to the fully discharged battery being charged.

\* \* \* \* \*